US012579469B1

(12) United States Patent
Chirayath et al.

(10) Patent No.: US 12,579,469 B1
(45) Date of Patent: Mar. 17, 2026

(54) TAXONOMY MANAGEMENT FOR LABELING DATA FOR TRAINING MACHINE LEARNING MODELS

(71) Applicant: Amazon Technologies, Inc., Seattle, WA (US)

(72) Inventors: Alex Anto Chirayath, Seattle, WA (US); Marcelo Aberle, San Francisco, CA (US); Mirza Khizer Baig, Chicago, IL (US); Jeremy Paul Michael Feltracco, Atlanta, GA (US); Ninad Kulkarni, Dublin, CA (US); Brenda Booth, Escondido, CA (US); Suchitra Sathyanarayana, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 923 days.

(21) Appl. No.: 17/805,844

(22) Filed: Jun. 7, 2022

(51) Int. Cl.
| | |
|---|---|
| *G06N 20/00* | (2019.01) |
| *G06F 16/903* | (2019.01) |
| *G06F 16/906* | (2019.01) |
| *G06F 18/214* | (2023.01) |
| *G06F 18/40* | (2023.01) |

(52) U.S. Cl.
CPC ....... *G06N 20/00* (2019.01); *G06F 16/90335* (2019.01); *G06F 16/906* (2019.01); *G06F 18/2155* (2023.01); *G06F 18/40* (2023.01)

(58) Field of Classification Search
CPC . G06N 20/00; G06F 16/906; G06F 16/90335; G06F 18/40; G06F 18/2155
See application file for complete search history.

(56) References Cited

U.S. PATENT DOCUMENTS

| | | | | |
|---|---|---|---|---|
| 8,122,005 | B1 * | 2/2012 | Juang | G06F 16/353 |
| | | | | 707/706 |
| 8,645,384 | B1 * | 2/2014 | Juang | G06F 16/986 |
| | | | | 707/738 |
| 10,275,690 | B2 | 4/2019 | Chen et al. | |
| 10,325,224 | B1 | 6/2019 | Erenrich et al. | |
| 10,776,626 | B1 * | 9/2020 | Lin | G06V 10/82 |
| 11,475,222 | B2 * | 10/2022 | Beller | G06F 40/289 |
| 11,763,945 | B2 * | 9/2023 | Maroo | G06F 18/254 |
| | | | | 706/45 |
| 2007/0250487 | A1 * | 10/2007 | Reuther | G06F 16/35 |
| 2008/0270312 | A1 * | 10/2008 | Ohata | G06Q 40/02 |
| | | | | 705/76 |

(Continued)

OTHER PUBLICATIONS

Gopalakrishna et al. Chaining Amazon SageMaker Ground Truth jobs to label progressively, 16 pages, retrieved at https://aws.amazon.com/blogs/machine-learning/chaining-amazon-sagemaker-ground-truth-jobs-to-label-progressively/, Nov. 20, 2019 (Year: 2019).*

*Primary Examiner* — Barbara M Level
(74) *Attorney, Agent, or Firm* — S. Scott Foster; Kowert, Hood, Munyon, Rankin & Goetzel, P.C.

(57) ABSTRACT

Taxonomy management may be performed for generating and executing data labeling jobs. Data labeling taxonomy versions are managed and reused for data labeling applications generated and executed by a data labeling system. Instead of building labeling jobs through the use of manually managed configuration files that provide a taxonomy, a single taxonomy can be registered, updated, and used multiple times for various different types of labeling scenarios, including chaining jobs and continual learning loops.

20 Claims, 9 Drawing Sheets

(56)                    References Cited

U.S. PATENT DOCUMENTS

| | | | | |
|---|---|---|---|---|
| 2013/0091138 A1* | 4/2013 | Liensberger | .......... | G06F 40/169 |
| | | | | 707/E17.127 |
| 2014/0280178 A1* | 9/2014 | Benyamin | ............ | G06F 16/285 |
| | | | | 707/740 |
| 2015/0347375 A1* | 12/2015 | Tremblay | ............. | G06F 16/367 |
| | | | | 704/9 |
| 2016/0103885 A1* | 4/2016 | Lee | .................... | G06F 16/2465 |
| | | | | 707/750 |
| 2018/0157386 A1 | 6/2018 | Su | | |
| 2018/0300576 A1 | 10/2018 | Dalyac et al. | | |
| 2019/0147297 A1* | 5/2019 | Rogers | ................... | G06N 20/00 |
| | | | | 706/12 |
| 2020/0097883 A1* | 3/2020 | Meng | ...................... | G06F 40/30 |
| 2020/0293712 A1* | 9/2020 | Potts | ..................... | G16H 10/60 |
| 2020/0312298 A1* | 10/2020 | Bui | ......................... | G06F 3/167 |
| 2021/0256420 A1* | 8/2021 | Elisha | .................... | G06N 20/00 |
| 2022/0019735 A1* | 1/2022 | Shekhar | ............. | G06F 16/9538 |
| 2022/0067545 A1* | 3/2022 | Calinescu | .............. | G06N 20/00 |
| 2022/0164714 A1* | 5/2022 | Hron, II | ................ | G06F 40/279 |
| 2022/0245106 A1* | 8/2022 | Dowler | ................. | G06F 16/288 |
| 2023/0074771 A1* | 3/2023 | Nefedov | ............ | G06F 16/9024 |
| 2023/0120195 A1* | 4/2023 | Song | ................... | G06F 16/2272 |
| | | | | 429/104 |
| 2023/0196138 A1* | 6/2023 | McKay | ................ | G06F 16/906 |
| | | | | 706/12 |
| 2025/0086398 A1* | 3/2025 | Yang | ...................... | G06N 20/00 |

* cited by examiner taxonomy management interface 410 taxonomy search 412 create version 422 | update version 424 | remove version 426 | compare versions 428 taxonomy version display 430 label 442     edit 443

Attribute     edit 444 add attribute 446 label 452     edit 453

Attribute     edit 454 add attribute 456 add label 460

FIG. 4

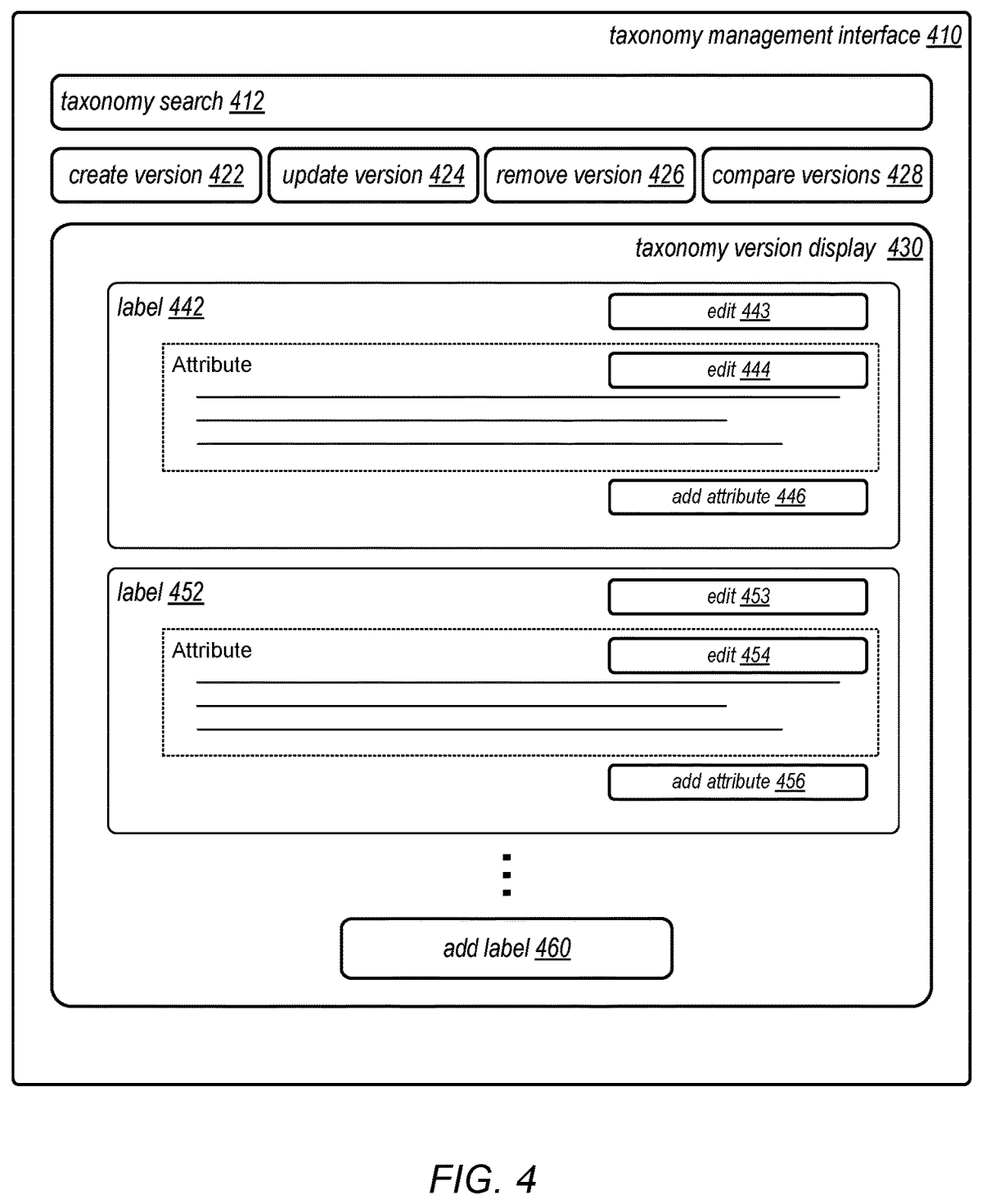

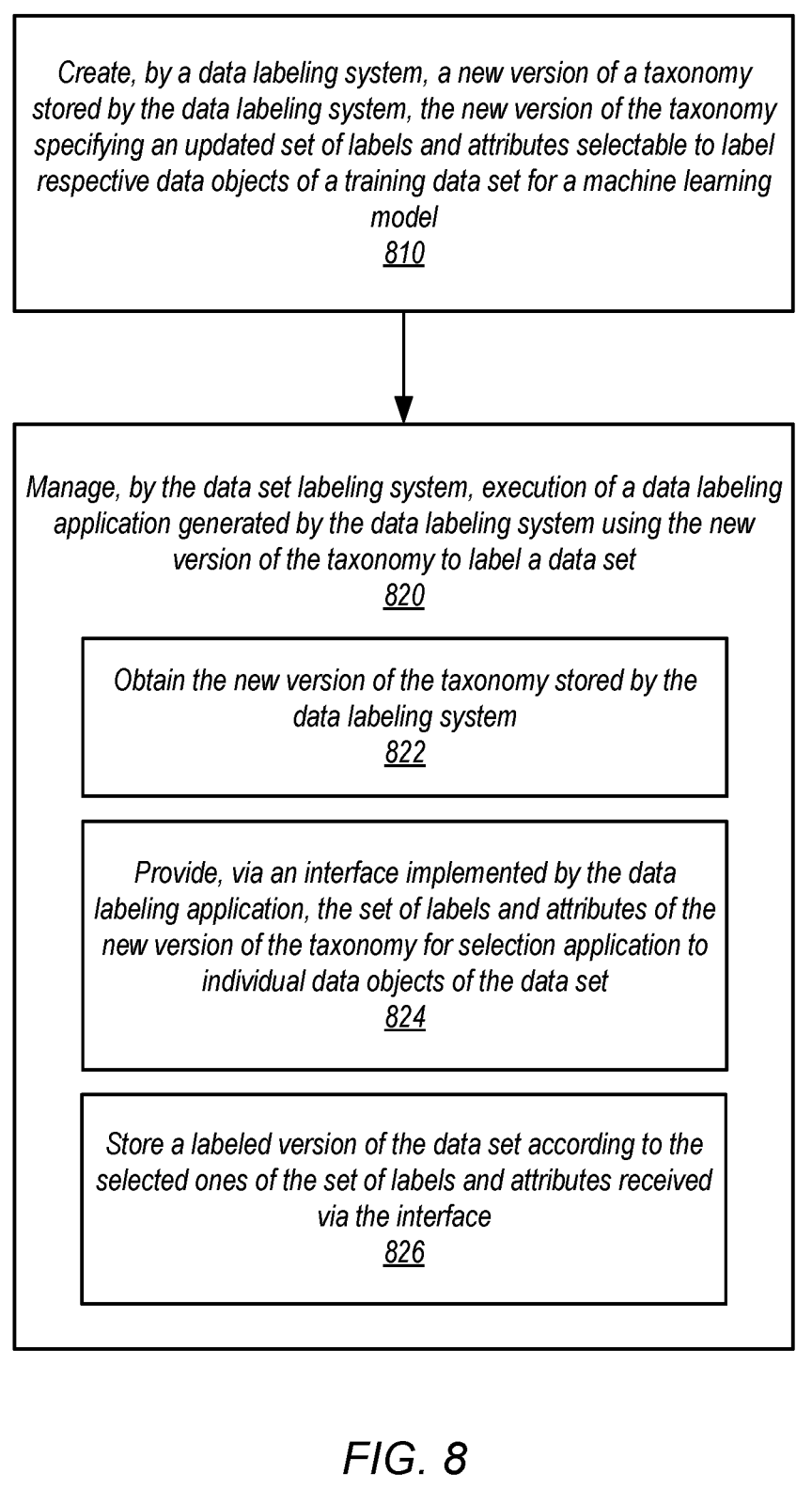

*Create, by a data labeling system, a new version of a taxonomy stored by the data labeling system, the new version of the taxonomy specifying an updated set of labels and attributes selectable to label respective data objects of a training data set for a machine learning model*
*810*

*Manage, by the data set labeling system, execution of a data labeling application generated by the data labeling system using the new version of the taxonomy to label a data set*
*820*

*Obtain the new version of the taxonomy stored by the data labeling system*
*822*

*Provide, via an interface implemented by the data labeling application, the set of labels and attributes of the new version of the taxonomy for selection application to individual data objects of the data set*
*824*

*Store a labeled version of the data set according to the selected ones of the set of labels and attributes received via the interface*
*826*

*FIG. 8*

TAXONOMY MANAGEMENT FOR LABELING DATA FOR TRAINING MACHINE LEARNING MODELS

BACKGROUND

Machine-learned models and data-driven systems have been increasingly used to help make decisions in various application domains. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

BRIEF DESCRIPTION OF THE DRAWINGS

FIG. 4 illustrates an example taxonomy management interface, according to some embodiments.

FIG. 8 is a high-level flowchart illustrating various methods and techniques for taxonomy management for labeling data sets for training machine learning models, according to some embodiments.

Figure 1:
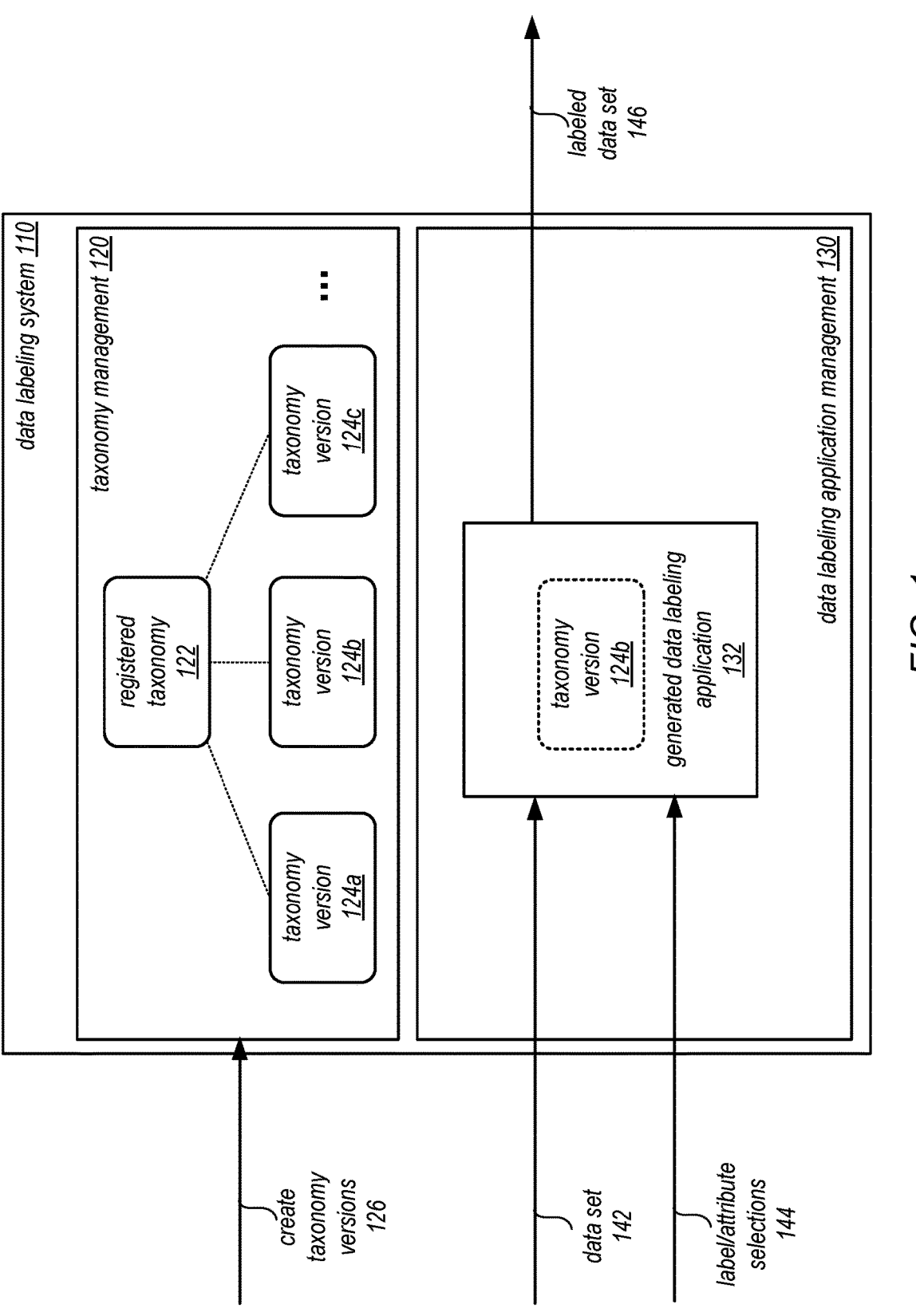
FIG. 1 illustrates a logical block diagram of a data labeling system that performs taxonomy management for labeling data sets for training machine learning models, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of taxonomy management for labeling data sets for training machine learning models are described herein. Data labeling applications may be used to provide high quality data sets for training machine learning models. Labels for training data sets may identify or otherwise provide a description, value, or other information that can allow a machine learning technique to train a machine learning model. For example, for machine learning techniques that perform computer vision tasks, a label may be applied to an object with image data (e.g., corresponding to a bounding box or other location information of the object within the image data) that describes or otherwise identifies the object (e.g., tree, car, animal, person, etc.). For other machine learning tasks, such as natural language tasks or audio processing, labels may identify various features of the text or audio for training different machine learning model implemented tasks (e.g., sentiment or intent of text, or the text of audible speech or classification of noises).

In order to ensure consistency of data objects (e.g., records, files, text, images, audio, etc.) within a given data set, a taxonomy may provide the various labels (as well as one or more attributes of the label and/or structure or relate labels (e.g., into categories)) which may be used to identify content or features of a data object in a data set. For example, the taxonomy may specify which labels and attributes are selectable when executing a data labeling application. Because taxonomies may change over time or may have different labels or attributes for different labeling applications (e.g., initial labeling, review labeling, modifying or cleaning up labeling, etc.), the number of taxonomies can be difficult to track. As discussed in detail below, by managing and tracking the various versions of a taxonomy, taxonomies can changed over time, reused, or automatically updated to support various features of a data labeling system. In this way, data labeling and throughput of various data labeling applications may be improved (e.g., as versions of data labeling applications can be automatically identified and used or updated as various scenarios warrant).

FIG. 1 illustrates a logical block diagram of a data labeling system that performs taxonomy management for labeling data sets for training machine learning models, according to some embodiments. Data labeling system 110 may implement both taxonomy management 120 and data labeling application management 130. Taxonomy management 120, as discussed in more detail below, may allow for one registered taxonomy 122 to have multiple taxonomy versions, such as taxonomy versions 124*a*. 124*b*, and 124*c*, which may have overlapping (e.g., partial overlap or super sets of labels), different, or various other changes to available labels and attributes in the different taxonomy versions. As indicated at 126, and discussed in more detail below, various requests to create new taxonomy versions may be supported. For example, taxonomy versions may be created via interfaces exposed to users (e.g., such as illustrated and discussed below with regard to FIG. 4) or be created automatically to perform different types of data labeling jobs.

These taxonomy versions 124 may be used as part of a generated data labeling application 132. For example, data labeling application management 130 may create a generated data labeling application 132 to perform a data labeling job and use a specific taxonomy version, such as taxonomy version 124*b*. In this way, when data set 142 is obtained for data labeling by generated data labeling application 132 for labeling, the selectable labels and attributes may be defined and provided by taxonomy version 124*b*. Requests to select labels/attributes may be received, as indicated at 144, and used to produce a labeled data set 146.

These techniques may support the execution of data labeling applications in many different scenarios. For example, as discussed below with regard to FIGS. 5 and 6, some data labeling applications may be chained or otherwise related to other data labeling applications. In this way, the output of one data labeling application may be used (e.g., in whole or in part, such as a filtered subset) as the input data set to another data labeling application. Different versions of the same taxonomy could then be used to execute the related data labeling applications in order to perform different phases of data labeling for a data set. This may improve the execution of related data labeling applications, including event-driven or other automated execution of multiple related data labeling applications as, for example, different versions of a taxonomy may be automatically created and used for different related data labeling applications by data labeling system 110.

Another scenario supported by taxonomy versioning is continuous learning applications, as discussed in detail below with regard to FIGS. 5 and 7. A deployed machine learning model may be refined using labeling loop that can further refine, monitor, or analyze the inferences made by the deployed machine learning model in order to generate a refined or new training data set for the deployed machine learning model. This may support techniques for improving both the performance of data labeling applications (e.g., by allowing for the implementation of a post-deployment taxonomy version) as well as creating a higher quality training data set for the deployed machine learning model in order to train and deploy a better version of the machine learning model.

As discussed above, labeled data sets may be used for training machine learning models. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," or a "prediction" during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. Computer vision machine learning models, for example, may be trained using training data sets of image data and may also make inferences to perform various computer vision tasks, such as image classification, object detection, or image regression, among others.

Please note that the previous description of is a logical illustration of a data labeling system and thus is not to be construed as limiting as to other embodiments of a machine learning system or other data labeling system.

This specification continues with a general description of a provider network that implements multiple different services, including a machine learning service, which may implement taxonomy management for labeling data sets for training machine learning models. Then various examples of, including different components/modules, or arrangements of components/module that may implement taxonomy management for labeling data sets for training machine learning models are discussed. A number of different methods and techniques to implement taxonomy management for labeling data sets for training machine learning models are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
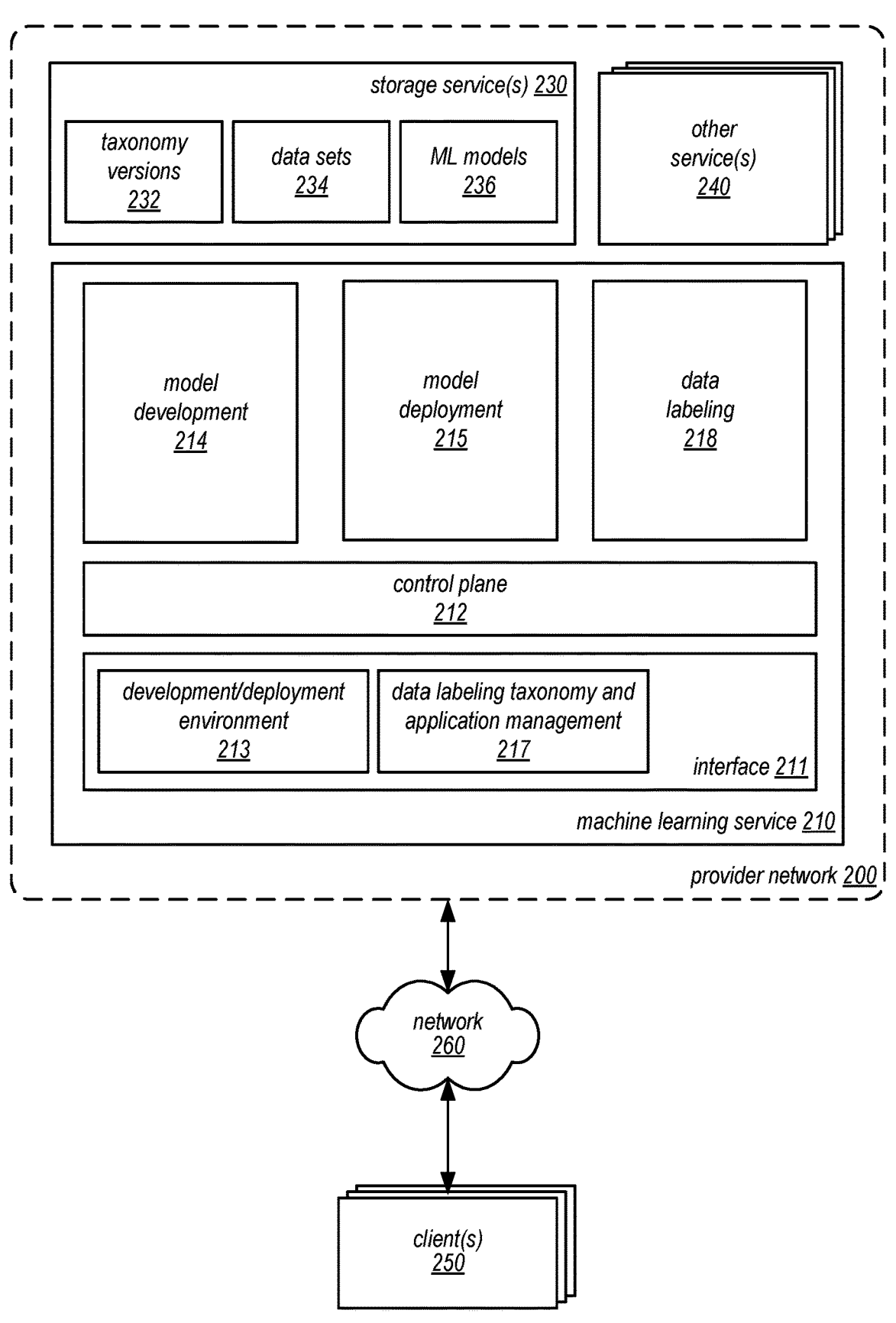
FIG. 2 illustrates an example provider network that may implement a machine learning service that implements taxonomy management for labeling data sets for training machine learning models, according to some embodiments.

FIG. 2 illustrates an example provider network that may implement a machine learning service that implements taxonomy management for labeling data sets for training machine learning models, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200, in one embodiment. In some embodiments, provider network 200 may implement various computing resources or services, such as machine learning service(s) 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning service 210 may implement interface 211 to allow clients (e.g., client(s) 250 or clients implemented internally within provider network 200, such as a client application hosted on another provider network service like an event driven code execution service or virtual compute service) to compress, train, and deploy machine learning models (e.g., neural networks) and/or utilize data labeling systems. For example, machine learning service 210 may implement interface 211 (e.g., a graphical user interface, programmatic interface that implements Application Program Interfaces (APIs) and/or a command line interface) may be implemented so that a client can submit, edit, or otherwise implement various different model development, deployment, labeling or other management requests. For example, interface 211 may include development and deployment environment 213, which may provide a training script or other code editor with various development tools to create, submit, and/or monitor machine learning pipeline with a training job and/or monitoring job, as discussed below. Development and management environment 213 may be a graphical interface, in some embodiments, and may provide an interface to past results generated for other models, in some embodiments. Similarly, data labeling taxonomy and application management 217 may provide various taxonomy editors, version management features, data labeling application creation interfaces or other features, such as discussed below with regard to FIGS. 3-5. Interface 211 may also allow a client to request the performance of training, deployment, or other machine learning service features, in various embodiments.

Machine learning service 210 may implement a control plane 212 to perform various control operations to implement the features of machine learning service 210. For example, control plane may monitor the health and performance of requests at different components, such as training as part of model development, execution of machine learning models as part of model deployment 215 or labeling applications as part of data labeling 218. For example, if a node or other component fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Machine learning service 210 may implement model development 214 to develop, configure, program, define, and/or otherwise execute training jobs on various machine learning models using data sets, such as data sets 234 in storage services 230 across one or more training nodes (which may include one or more respective processing devices for training, such as GPUs). In some embodiments machine learning service 210 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, development environment 213, and executed. Various tests or other development operations for machine learning models may also be performed. In some embodiments, the various files, configuration information, and other data for machine learning model development may be organized as a project (or other collection) and stored, versioned, or otherwise managed by model development 214 (e.g., as a collection of one or more files or data objects in storage services 230, including data sets 234 and ML models 236). Training jobs may be submitted to training nodes (e.g., via development environment 213 or other interfaces) to train machine learning models on identified data set(s).

In various embodiments, machine learning service 210 may implement model deployment 215, which may deploy a trained machine learning model on resources (e.g., virtual compute instances or containers) to receive and return inferences or other results according to requests or other inputs to the deployed model. For example, different types or configurations of resources (e.g., virtual compute instances with various hardware capabilities, including different amounts of processing capacity, memory, storage, and/or specialized hardware, such as GPUs and tensor processor units (TPUs)) may be provisioned or otherwise obtained from other services of provider network 200 (e.g., a virtual compute service) and then the machine learning model deployed to that provisioned resource along with various software or other applications to support the receipt of requests for inferences and return inferences.

In various embodiments, data labeling applications may be implemented or managed as part of data labeling 218 to provide data sets 234 for training and developing machine learning models, as discussed in detail below with regard to FIGS. 3-8. Data labeling 218 may handle the management of different taxonomy versions 232, which may be stored in (or more) storage service(s) 230. For example, data labeling 218 may handle the various requests discussed below with regard to taxonomy management, such as the requests to store and/or update taxonomy versions, as discussed in detail below with regard to FIGS. 3 and 4.

Data labeling 218 may also implement various features to manage execution of data labeling applications in various embodiments, as discussed in detail below with regard to FIG. 5. For example, similar to model development 214 and model deployment 215, one or more nodes or other computing resources may be managed by data labeling 218 in order to generate and execute a data labeling application. As discussed below, different data labeling jobs may be used to instantiate and execute a data labeling application. For instance, different parameters to specify or otherwise configure the interface of a data labeling application, the input data set(s), the taxonomy (in some embodiments), or various other parameters for the data labeling application. Data labeling 218 may then generate (e.g., modify a data labeling application according to the received parameters) and then install or otherwise deploy the application to the provisioned nodes.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 210 (e.g., a request to create or perform an explanation job, interact with development and management environment 213, etc.). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to configure or perform explanation jobs) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
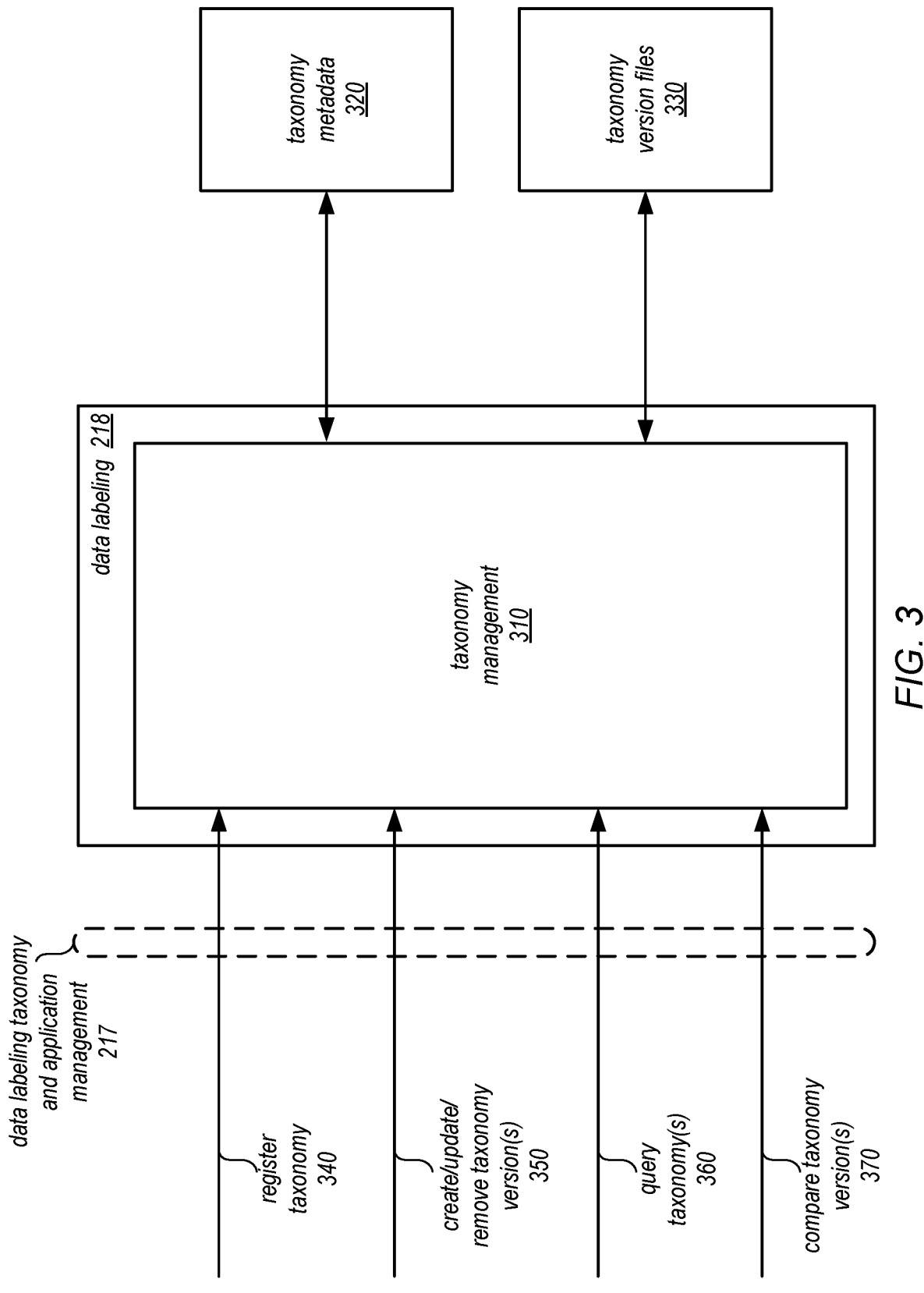
FIG. 3 illustrates a logical block diagram illustrating taxonomy management for managing taxonomies, according to some embodiments.

FIG. 3 illustrates a logical block diagram illustrating taxonomy management for managing taxonomies, according to some embodiments. Data labeling 218 may implement taxonomy management 310 (e.g., similar to that of FIG. 1) which may support various requests. For example, a request to register a new taxonomy may be received, as indicated at 340. This may include storing an initial version in taxonomy version files 330 (e.g., a JSON or other file describing the available labels and attributes located in a storage location, such as in a storage service or uploaded to taxonomy management 310 from an location external to provider network 200). In some embodiments, a user interface, such as is discussed below with regard to FIG. 4 may be used to register a new taxonomy. For example, various template taxonomies may be selectable and used to register the taxonomy. A computer vision task template, such as object classification, may be selectable with various pre-filled or partially taxonomy values (e.g., label and/or attribute fields common to computer vision tasks) filled to complete the various object categories, labels, and attribute values (some of which may be pre-filled or provided by the template.

Similar, taxonomy metadata 320 may be updated to include information describing the taxonomy (e.g., version info, description, etc.). For example, taxonomy metadata 320 may be used to track version uses (e.g., track those data labeling applications that have (or will) use a taxonomy version). Similarly, taxonomy metadata 330 may include information used for query or other access or management purposes (e.g., which user created a taxonomy, what label categories (or labels) are in a taxonomy, etc.).

Another request may be to create, update, or remove taxonomy versions, as indicated at 350. For example, new versions can be created by making changes to a prior version (e.g., changes to labels, attributes of labels, categories, or other taxonomy changes). A current version may be updated (and not result in a new version), in some embodiments. In some embodiments, a taxonomy version may be removed (e.g., deleted or made unavailable), in some embodiments. Corresponding changes to taxonomy metadata 320 and taxonomy version files 330 may be made.

Another request may be to query taxonomies, as indicated at 360. For example, a query to list all versions of a particular taxonomy (e.g., by taxonomy name) may be performed. In some embodiments, queries on the particular attributes, or associated jobs/data labeling applications may be performed with respect to taxonomies or taxonomy versions. Results may be returned for queries (although not illustrated in FIG. 3). Queries may be supported by evaluating taxonomy metadata 320 and taxonomy version files (e.g., using various indexing or text search techniques).

Another request may be to compare taxonomy versions, as indicated at 370. For example, the request 370 may include different taxonomy version identifiers. Taxonomy management 310 may access and perform a difference or other compare operation to identify the different categories, labels, and/or attributes of the two (or more) versions of the taxonomy and provide them in a result via interface 217 (not illustrated).

FIG. 4 illustrates an example taxonomy management interface, according to some embodiments. Taxonomy management interface 410 may utilize various different types of user interface elements. Thus the following examples are not intended to be limiting. A taxonomy search element 412 (e.g., supporting various taxonomy or taxonomy version queries as discussed above with regard to FIG. 3 may be supported). Other elements supporting other actions, such as creating a new taxonomy version 422, updating a version 424 or removing a version 426 (as discussed above with regard to FIG. 3) may be supported. Another use interface element 428 may cause a taxonomy comparison to be performed (as discussed above with regard to FIG. 3).

As illustrated in FIG. 4, a taxonomy version display may be provided, as indicated at 430, which may display a taxonomy version, including the various labels 442 and 452, along with corresponding attributes. Elements to edit or add labels or attributes may be included, as indicated at 443, 444, 446, 453, 454, 456, and 460. Although not illustrated, various categories of labels may be specified and/or edited according to different user interface elements.

Figure 5:
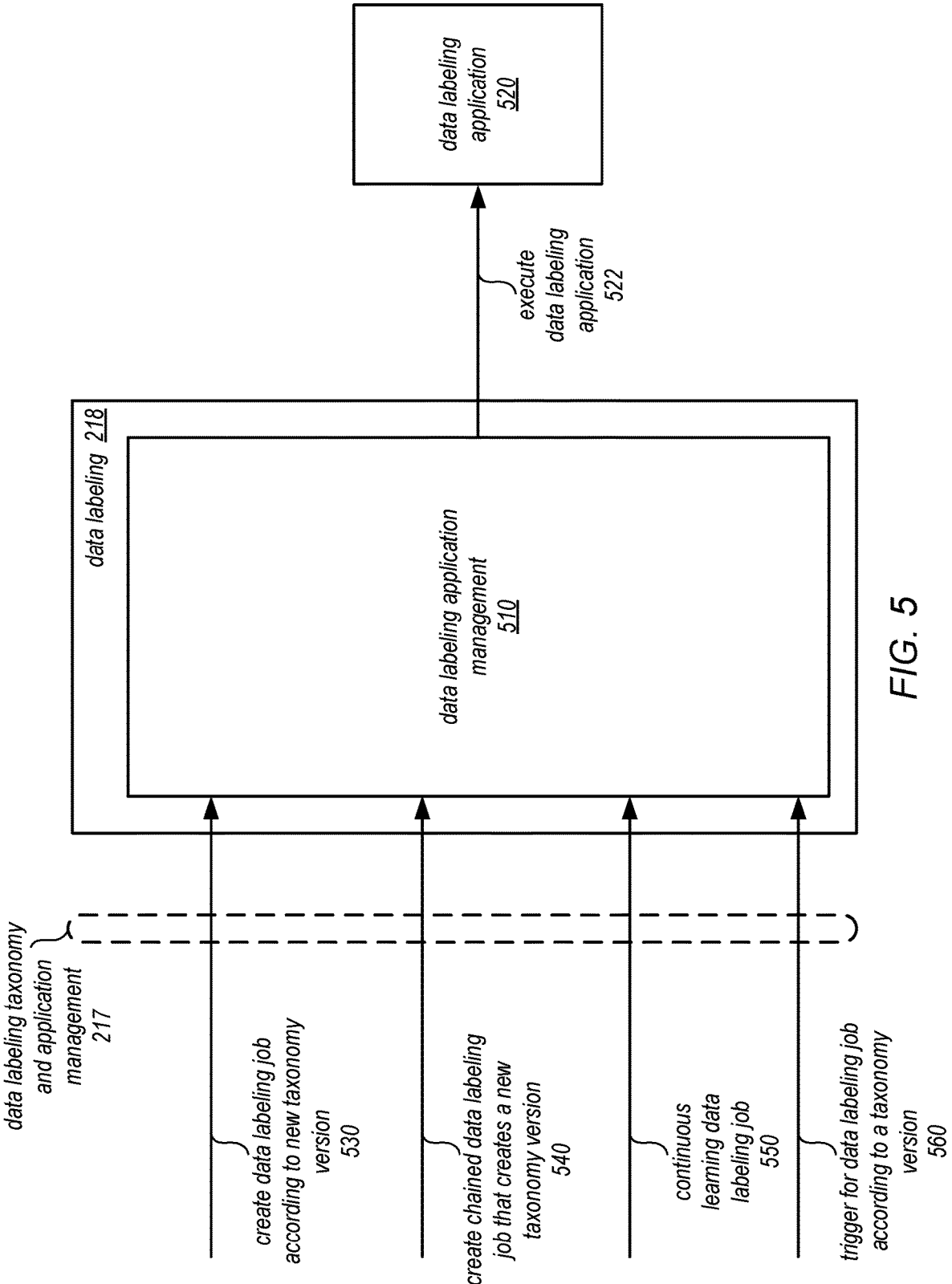
FIG. 5 illustrates a logical block diagram illustrating data label application management, according to some embodiments.

FIG. 5 is a logical block diagram illustrating data label application management, according to some embodiments. Data labeling application management 510 may support different data labeling jobs, which may cause the generation and execution of data labeling applications to be managed by data labeling application management 510. As discussed above with regard to FIG. 2, data labeling application management 510 may provision the appropriate resources, configure and/or otherwise construct the data labeling application (e.g., by compiling code configured with parameters provided as part of the various illustrated requests or modifying a configurable data labeling application for execution using the various parameters), and then cause execution of the data labeling application on the provisioned resources.

Data labeling application management 510 may handle the various requests for data labeling jobs that refer to a new taxonomy, as indicated at 530. For example, a data labeling job may be created for a new or different phase of data set generation (e.g., to refine or modify an original data labeling job) using a newly created taxonomy version by a user (e.g., according to the techniques discussed above with regard to FIGS. 3 and 4). The request 530 may allow for the specific version of the taxonomy to be requested as part of providing various other parameters for the execution of the data labeling job (e.g., interface parameters, data set parameters, identities of access accounts or users that will utilize the data labeling application interface to perform data labeling operations or tasks as instructed by the data labeling application, etc.). Data labeling application management 510 may then create and execute the data labeling application with the new taxonomy version, as discussed below with regard to FIG. 6.

Another request may be a request to create a chained data labeling jobs, as indicated at 540, in some embodiments. As discussed above, data labeling applications may be related to the execution of other data labeling applications (e.g., to refine, modify, analyze, or diverge). Request 540 may support the automatic creation of a new taxonomy version to perform a specific task or operation of a chained data labeling job. For example, various refinement or analysis data labeling tasks (e.g., a Quality Assurance task) may be performed on an entire data set from a prior application (or a subject, such as a filtered subset). Data labeling application management 510 may be able to determine what taxonomy changes should be made to a given taxonomy version in order to perform the chained data labeling job (e.g., what attributes should be removed or added for an analysis task, such as correct or incorrect attributes for labels applied in prior data labeling application). Data labeling application management 510 may then create the new taxonomy version and then execute the data labeling application, as discussed below with regard to FIG. 6.

Another request may be a request for a continuous learning data labeling jobs, as indicated at 550. A continuous learning data labeling job may, as discussed in detail below with regard to FIG. 7, allow for a taxonomy version to be used in the labeling of deployed machine learning model to refine or create new data sets for training a new version of the machine learning model.

Figure 6:
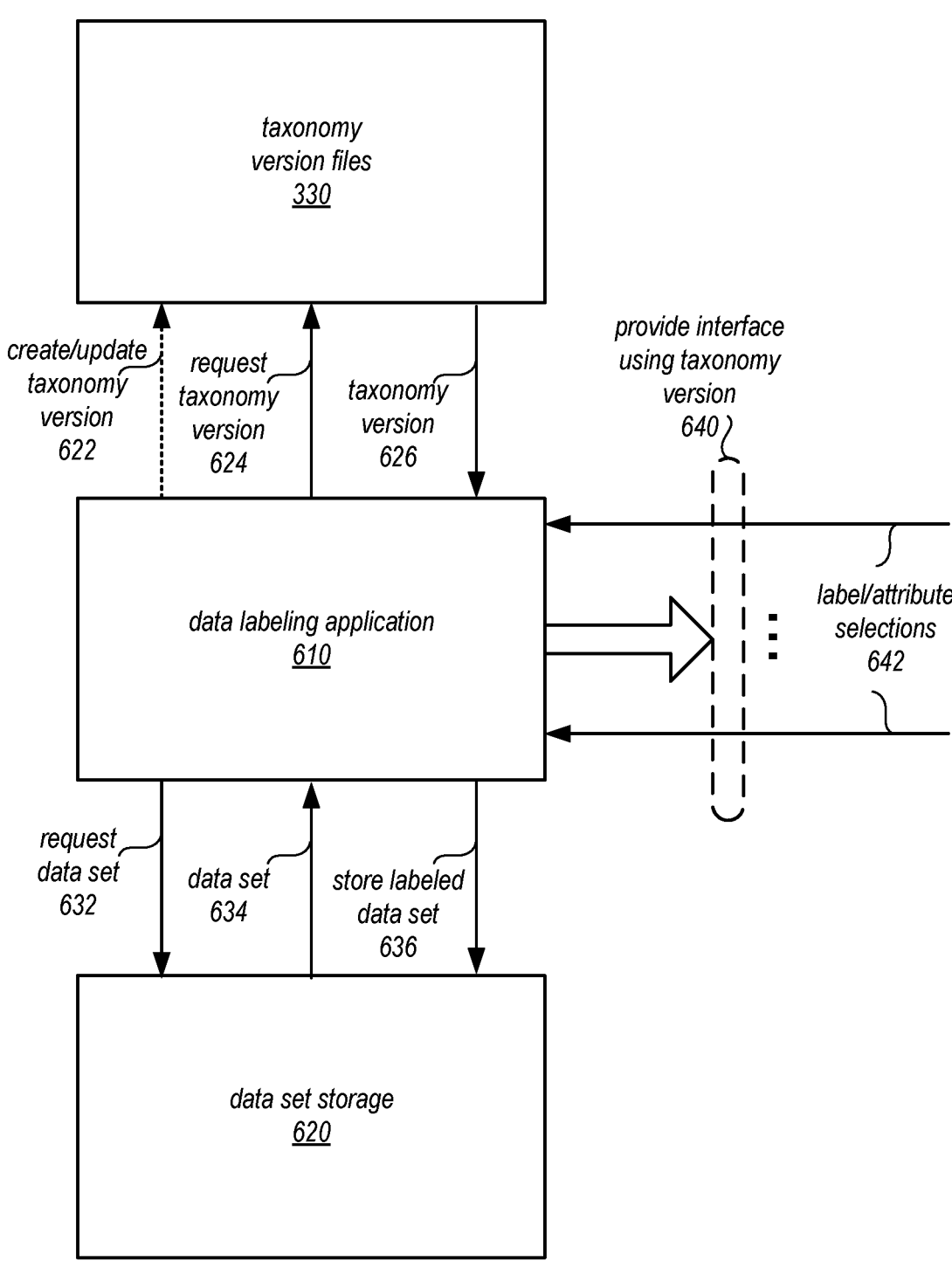
FIG. 6 is a logical block diagram illustrating a data label application that is used for chained or otherwise associated taxonomy versions, according to some embodiments.

In some embodiments, events of various kinds may trigger the execution of a data labeling job. For example, as indicated at 560, a trigger may be an event that causes a data labeling job using a taxonomy version. One such triggering event may be the addition of a new data set for training, which may cause a taxonomy version associate with initial training to be used. In some embodiments, a modification to a taxonomy (e.g., the creation of a new taxonomy version or the update of an existing taxonomy version) may be a triggering event. Data labeling application management 510 may generate and execute the appropriate data labeling application 520 according to a mapping or other information that links triggering events to data labeling applications, in some embodiments According to the various types of job, data labeling application management 510 may execute the data labeling application 520, as discussed in detail below with regard to FIGS. 6 and 7. For example, FIG. 6 is a logical block diagram illustrating a data label application that is used for chained or otherwise associated taxonomy versions, according to some embodiments. Data labeling application 610, which may be used to implement various initial labeling, quality assurance, labeling verification, data cleanup or other operations may sometimes be the cause of new or updated taxonomy version 622 (or use a taxonomy version identified as part of the job). As indicated at 624, the taxonomy version may be requested or otherwise obtained (e.g., according to taxonomy name and version identifier, or taxonomy version storage location as indicated in taxonomy version metadata) and provided, as indicated at 624. Similarly, as indicated at 632, the data set for the data labeling application to operate upon may be requested (e.g. according to identifier, name, or storage location), and returned, as indicated at 634. Data labeling application 610 may provide an interface (e.g., configured according to parameters specified for or determined for data labeling application 610) using the taxonomy version 640, via which label and attribute selections may be made, as indicated at 642. The labeled data set may then be stored, as indicated at 632.

Figure 7:
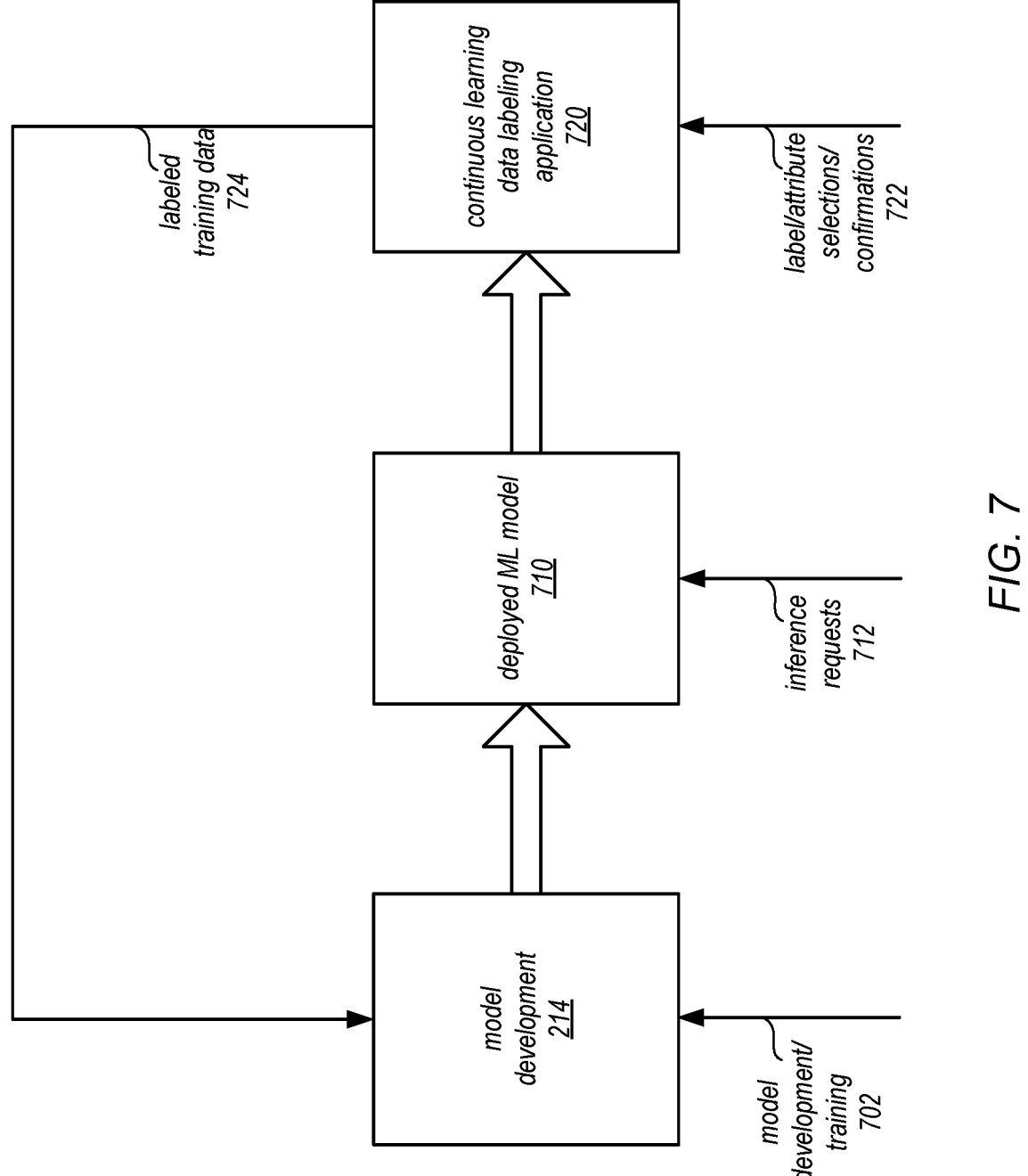
FIG. 7 is a logical block diagram that illustrates a continuous learning data labeling job, according to some embodiments.

FIG. 7 is a logical block diagram that illustrates a continuous learning data labeling job, according to some embodiments. As illustrated in FIG. 7, different stages, model development 214, deployed ML model 710 may be involved with continuous learning data labeling application 720. For example, model development and training interactions 702 may be made to model development 214. As discussed above with regard to FIG. 2, these interactions may include specifying (e.g., as scripts, code, or other files) the architecture of a machine learning model, the hyperparameters for training the machine learning model, the training data set (including labeled training data 724), among other interactions.

As discussed above with regard to FIG. 2, a model may be deployed on computing resources (e.g., hosted by machine learning service 210). In some embodiments, deployed mode 710 may have been created and trained at model development stage 214. In some embodiments, deployed ML model 710 may be a pre-trained model (which may then be refined using continuous learning techniques described below). For a deployed ML model 710, inference requests may be made. For example a network endpoint (e.g., network address) may support various API or other programmatic requests from clients to perform an inference using input data provided in the request (e.g., in the form of an input vector).

From the output of the inference requests, additional labeling may be performed at continuous learning data labeling application 720 using ML models (e.g., to perform a first-pass labeling job) and/or human annotators using a labels and attributes of a determined taxonomy version, as indicated at 722. This taxonomy version may be specified as part of a continuous learning job request, as discussed above with regard to FIG. 5. This labeled training data 724 from the execution of a continuous learning data labeling application 720 created and managed by data labeling 28 can then be executed to provide feedback for subsequent model training iterations.

Although FIGS. 2-7 have been described and illustrated in the context of a provider network implementing a machine learning service, the various components illustrated and described in FIGS. 2-7 may be easily applied to other machine learning systems that use data labeling systems. As such, FIGS. 2-7 are not intended to be limiting as to other embodiments.

FIG. 8 is a high-level flowchart illustrating various methods and techniques for taxonomy management for labeling data sets for training machine learning models, according to some embodiments. As indicated at 810, a new version of a taxonomy stored by the data labeling system may be created by a data labeling system, in some embodiments. The new version of the taxonomy may specify an updated set of labels and attributes selectable to label respective data objects of a training data set for a machine learning model. As discussed above with regard to FIGS. 1 and 3-7, the new version of the taxonomy may be created manually (e.g., through various API calls or user interface elements) and/or may be created automatically (e.g., for the performance of chained, related, or other data labeling applications).

As indicated at 820, the data set labeling system, may manage execution of a data labeling application generated by the data labeling system using the new version of the taxonomy to label a data set, in some embodiments. For example, as discussed above, the data labeling system may generate a data labeling application according to a requested job (e.g., manually created, chained, or otherwise related to another data labeling application, or automatically in response to a triggering event, such as the creation of the new version of the taxonomy). Once created, the data labeling system may provision computing resource(s) (or host on the same computing resource(s) as the data labeling system) for the execution of the data labeling application. The data labeling system may use various parameters provided as part of a request to create a data labeling job or application (or determined from an automatic application creation mapping) that will configure the execution of the data labeling application, such as the taxonomy version, interface parameters (e.g., configuration shape, layout, instructions or other attributes of the labeling interface), data set parameters, and identities of access accounts or users that will utilize the data labeling application interface to perform data labeling operations or tasks as instructed by the data labeling application.

As part of executing the data labeling application, obtain the new version of the taxonomy stored by the data labeling system, as indicated at 822. For example, a taxonomy name and/or version identifier may be used to request, lookup, access, or otherwise read the taxonomy version for use by the data labeling application. As part of executing the data labeling application, the set of labels and attributes of the new version of the taxonomy for selection application to individual data objects of the data set may be provided, via an interface implemented by the data labeling application, as indicated at 822. For example, various drop down menus, text entry elements, graphical elements, symbols, or other label and/or attribute specification elements may be included via the interface to allow a user to select the appropriate labels and attributes for different data objects of the data set.

As part of executing the data labeling application, a labeled version of the data set may be stored according to the selected ones of the set of labels and attributes received via the interface, as indicated at 822. For example, the data labeling application may store the labeled data set in a specified storage location (e.g., via one of the received or determined parameters for the data labeling application).

The methods described herein may in various embodiments be implemented by any combination of hardware and software. For example, in one embodiment, the methods may be implemented on or across one or more computer systems (e.g., a computer system as in FIG. 9) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
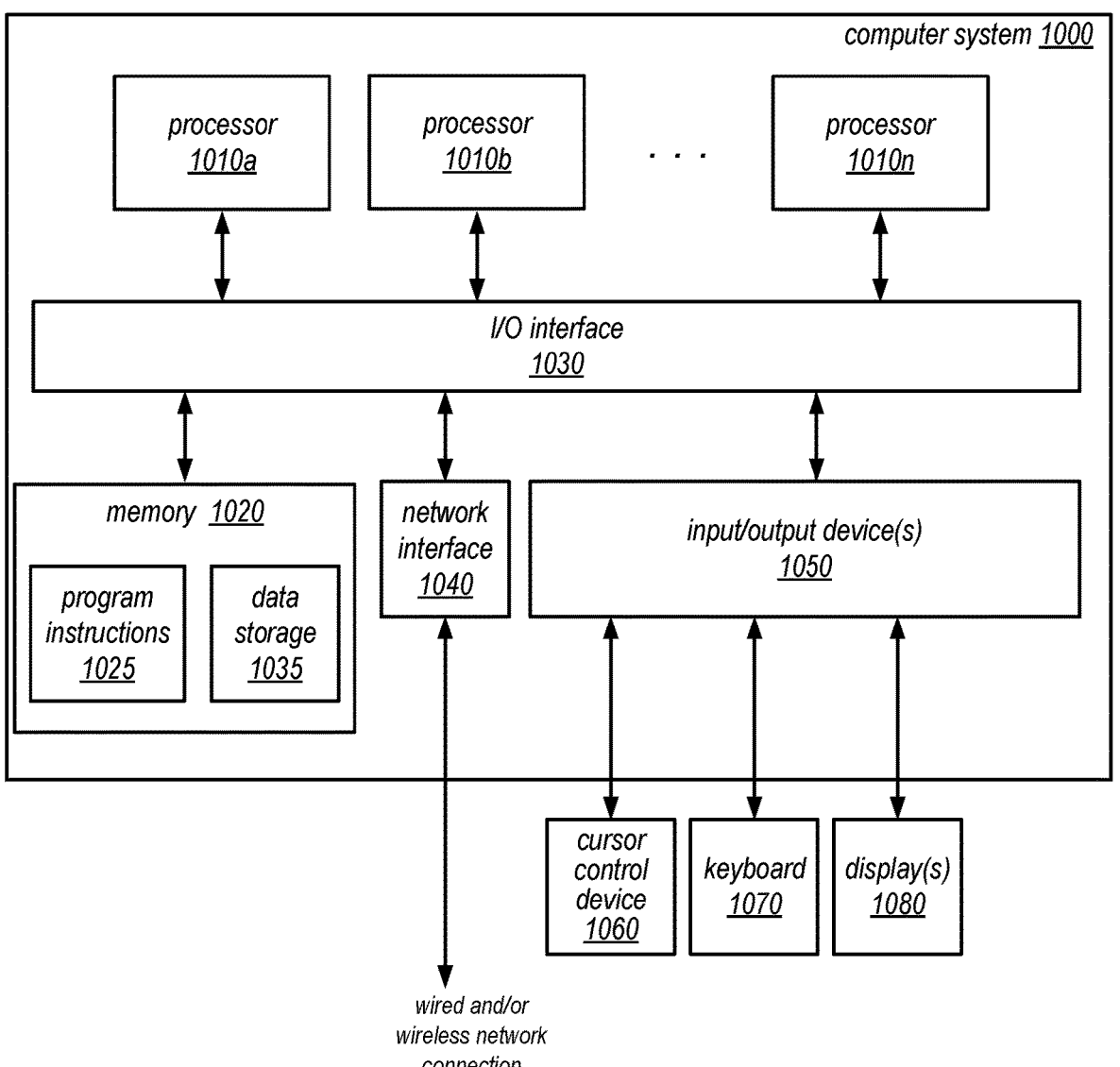
FIG. 9 illustrates an example system to implement the various methods, techniques, and systems described herein, according to some embodiments.

Embodiments of taxonomy management for labeling data sets for training machine learning models as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC. SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to:

update a first version of a taxonomy stored by a data labeling system to create a second version of the taxonomy, wherein the first version and the second version of the taxonomy are different accessible versions of the taxonomy registered to generate data labeling applications, wherein the second version of the taxonomy specifies an updated set of labels and attributes selectable to label respective data objects of a training data set for a machine learning model;

generate a data labeling application that uses the second version of the taxonomy for labeling a data set according to a determination that the second version of the taxonomy is one of the different accessible versions of the taxonomy to use to generate the data labeling application; and cause execution of the data labeling application, wherein the execution of the data labeling application causes the data labeling application to:

obtain the second version of the taxonomy stored by the data labeling system;

provide, via an interface implemented by the data labeling application, the set of labels and attributes of the second version of the taxonomy for selection and application to individual data objects of the data set; and store a labeled version of the data set according to the selected ones of the set of labels and attributes received via the interface.

2. The system of claim 1, wherein the memory stores further program instructions that when executed further cause the at least one processor to:

receive a request to create a continuous learning data labeling job at the data labeling system that is performed using the data set provided as a result of a deployed machine learning model; and wherein the data labeling application is executed to perform the continuous learning data labeling job and wherein the labeled version of the data set is stored as a new training data set available for training a different version of the deployed machine learning model as part of a model development system.

3. The system of claim 1, wherein the memory stores further program instructions that when executed further cause the at least one processor to:

receive a request to create a chained data labeling job at the data labeling system that is performed using the data set provided as a result of a prior data labeling job; and wherein the update to the first version of a taxonomy stored by the data labeling system to the second version is performed responsive to the receipt of the request to create the chained data labeling job at the data labeling system and wherein the data labeling application is generated and executed to perform the chained data labeling job using the data set provided as the result of the prior data labeling job.

4. The system of claim 1, wherein the data labeling system is implemented as part of a machine learning service offered by a provider network, wherein the data set is obtained from a data storage service offered by the provider network, and wherein the labeled version of the data set is stored as part of the storage service and available for training the machine learning model as part of a model development system implemented as part of the machine learning service.

5. A method, comprising:

creating, by a data labeling system, a new version of a taxonomy stored by the data labeling system, wherein the new version of the taxonomy specifies an updated set of labels and attributes selectable to label respective data objects of a training data set for a machine learning model, wherein the new version is one of a plurality of different accessible versions of the taxonomy registered to generate data labeling applications;

managing, by the data labeling system, execution of a data labeling application generated by the data labeling system using the new version of the taxonomy to label a data set, wherein the execution of the data labeling application comprises:

obtaining the new version of the taxonomy stored by the data labeling system according to a determination that the new version of the taxonomy is one of the different accessible versions of the taxonomy to use to generate the data labeling application;

providing, via an interface implemented by the data labeling application, the set of labels and attributes of the new version of the taxonomy for selection and application to individual data objects of the data set; and storing a labeled version of the data set according to the selected ones of the set of labels and attributes received via the interface.

6. The method of claim 5, further comprising:

receiving a request to create a continuous learning data labeling job at the data labeling system that is performed using the data set provided as a result of a deployed machine learning model; and wherein the data labeling application is executed to perform the continuous learning data labeling job and wherein the labeled version of the data set is stored as a new training data set available for training a different machine learning model as part of a model development system.

7. The method of claim 5, wherein the taxonomy is one of a plurality of taxonomies stored by the data labeling system and wherein the method further comprises:

returning, at least the taxonomy of the plurality of taxonomies, in satisfaction of a query for taxonomies received at the data labeling system.

8. The method of claim 5, further comprising:

prior to creating the new version of the taxonomy stored by the data labeling system, receiving a request to register the taxonomy for use by data labeling applications at the data labeling system.

9. The method of claim 5, further comprising:

receiving a request to create a data labeling job at the data labeling system that is performed using the new version of the taxonomy; and wherein the data labeling application is executed to perform the data labeling job.

10. The method of claim 5, further comprising:

receiving a request to create a chained data labeling job at the data labeling system that is performed using the data set provided as a result of a prior data labeling job; and wherein the creating the new version of the taxonomy is performed responsive to receiving the request to create the chained data labeling job at the data labeling system and wherein the data labeling application is executed to perform the chained data labeling job using the data set provided as the result of the prior data labeling job.

11. The method of claim 5, further comprising:

receiving one or more requests to update a prior version of the taxonomy at the data labeling system; and wherein the creating the new version of the taxonomy is performed responsive to receiving the one or more requests to update the prior version of the taxonomy.

12. The method of claim 5, further comprising managing, by the data labeling system, execution of a second data labeling application generated by the data labeling system using the new version of the taxonomy to label a second data set.

13. The method of claim 5, further comprising detecting, by the data labeling system, the creation of the new version of the taxonomy, wherein the execution of a data labeling application generated by the data labeling system using the new version of the taxonomy to label the data set is performed responsive to detecting the creation of the new version of the taxonomy.

14. One or more non-transitory, computer-readable storage media, storing program instructions that when executed on or across one or more computing devices cause the one or more computing devices to implement:

updating, by a data labeling system, a first version of a taxonomy stored by the data labeling system to a second version of the taxonomy, wherein the first version and the second version of the taxonomy are different accessible versions of the taxonomy registered to generate data labeling applications, wherein the second version of the taxonomy specifies an updated set of labels and attributes selectable to label respective data objects of a training data set for a machine learning model;

causing, by the data labeling system, execution of a data labeling application generated by the data labeling system to use the second version of the taxonomy to label a data set, wherein the execution of the data labeling application comprises:

obtaining the second version of the taxonomy stored by the data labeling system according to a determination that the second version of the taxonomy is one of the different accessible versions of the taxonomy to use to generate the data labeling application;

providing, via an interface implemented by the data labeling application, the set of labels and attributes of the second version of the taxonomy for selection and application to individual data objects of the data set; and storing a labeled version of the data set according to the selected ones of the set of labels and attributes received via the interface.

15. The one or more non-transitory, computer-readable storage media of claim 14, storing further program instructions that when executed on or across the one or more computing devices, cause the one or more computing devices to further implement:

receiving a request to create a continuous learning data labeling job at the data labeling system that is performed using the data set provided as a result of a deployed machine learning model; and wherein the data labeling application is executed to perform the continuous learning data labeling job and wherein the labeled version of the data set is stored as a new training data set available for training a different machine learning model as part of a model development system.

16. The one or more non-transitory, computer-readable storage media of claim 14, storing further program instructions that when executed on or across the one or more computing devices, cause the one or more computing devices to further implement:

prior to creating the new version of the taxonomy stored by the data labeling system, receiving a request to register the taxonomy for use by data labeling applications at the data labeling system.

17. The one or more non-transitory, computer-readable storage media of claim 14, storing further program instructions that when executed on or across the one or more computing devices, cause the one or more computing devices to further implement:

receiving a request to create a chained data labeling job at the data labeling system that is performed using the data set provided as a result of a prior data labeling job; and wherein the updating the first version of the taxonomy stored by the data labeling system to the second version is performed responsive to receiving the request to create the chained data labeling job at the data labeling system and wherein the data labeling application is executed to perform the chained data labeling job using the data set provided as the result of the prior data labeling job.

18. The one or more non-transitory, computer-readable storage media of claim 14, wherein the data labeling application is executed to perform a second data labeling job on the data set, wherein the data set was previously labeled using a different version of the taxonomy, and wherein the set of labels and attributes of the second version of the taxonomy is a superset of another set of labels and attributes of the different version of the taxonomy.

19. The one or more non-transitory, computer-readable storage media of claim 14, storing further program instructions that when executed on or across the one or more computing devices, cause the one or more computing devices to further implement:

receiving one or more requests to update the first version of the taxonomy at the data labeling system; and wherein the updating the first version of the taxonomy stored by the data labeling system to the second version is performed responsive to receiving the one or more requests to update the first version of the taxonomy.

20. The one or more non-transitory, computer-readable storage media of claim 14, storing further program instructions that when executed on or across the one or more computing devices, cause the one or more computing devices to further implement:

receiving, via an interface of the data labeling system, a request for a comparison of the first version of the taxonomy with a second version of the taxonomy; and providing, via the interface of the data labeling system, those differences between the first version of the taxonomy and the second version of the taxonomy responsive to the request for the comparison.

* * * * *